(12) United States Patent
Radhakrishnan et al.

(10) Patent No.: US 8,638,747 B2
(45) Date of Patent: Jan. 28, 2014

(54) SYSTEM AND METHOD FOR HANDOFFS BETWEEN TECHNOLOGIES

(75) Inventors: Shaji E. Radhakrishnan, Nashua, NH (US); Sanil Kumar Puthiyandyil, Nashua, NH (US); Rajesh Ramankutty, Nashua, NH (US); Leonard Schwartz, North Andover, MA (US)

(73) Assignee: Cisco Technology, Inc., San Jose, CA (US)

( * ) Notice: Subject to any disclaimer, the term of this patent is extended or adjusted under 35 U.S.C. 154(b) by 1142 days.

(21) Appl. No.: 12/028,280

(22) Filed: Feb. 8, 2008

(65) Prior Publication Data

US 2008/0205342 A1 Aug. 28, 2008

Related U.S. Application Data

(60) Provisional application No. 60/900,232, filed on Feb. 8, 2007.

(51) Int. Cl.
*H04W 4/00* (2009.01)
*H04Q 11/00* (2006.01)

(52) U.S. Cl.
USPC .......................................... 370/331; 370/261

(58) Field of Classification Search
USPC ....................................................... 370/331
See application file for complete search history.

(56) References Cited

U.S. PATENT DOCUMENTS 7,130,625 B2  10/2006  Akgun et al.
7,502,615 B2 *  3/2009  Wilhoite et al. .............. 455/442
7,660,584 B2 *  2/2010  Maxwell et al. .............. 455/436
7,990,875 B2 *  8/2011  Massiera et al. .............. 370/237
8,451,794 B2 *  5/2013  Ergen et al. ................... 370/331
8,510,455 B2 *  8/2013  Xia et al. ...................... 709/230

(Continued)

FOREIGN PATENT DOCUMENTS

EP   1608189 A1   12/2005
EP   1 435 748 B1   3/2006

(Continued)

OTHER PUBLICATIONS

International Search Report and Written Opinion issued for corresponding International Patent Application No. PCT/US2008/053464.

(Continued)

*Primary Examiner* — Guang Li
(74) *Attorney, Agent, or Firm* — Wilmer Cutler Pickering Hale and Dorr LLP

(57) ABSTRACT

Systems and methods for providing a handoff between technologies are disclosed. An intra-technology handoff occurs where the same integrated chassis handles the session for the different access technologies. In an intra-technology handoff, the same IP address and the session can be maintained through the handoff. The mobile node can undergo a handoff without issuing a registration request in some embodiments. An inter-technology handoff occurs from one integrated chassis to another integrated chassis. The integrated chassis can preserve session and context information in a session manager and in a handoff from one access technology to another the same session manager can be chosen with the session and context information remaining intact even though the access technology has changed. The integrated chassis can provide an access technology handoff where the core network does not notice any change and applications running on or delivered to the mobile node are not effected.

19 Claims, 17 Drawing Sheets

(56) References Cited

U.S. PATENT DOCUMENTS

| | | | |
|---|---|---|---|
| 2004/0008645 A1* | 1/2004 | Janevski et al. | 370/331 |
| 2004/0090937 A1 | 5/2004 | Chaskar et al. | |
| 2004/0218564 A1 | 11/2004 | Henrikson | |
| 2005/0053034 A1 | 3/2005 | Chiueh | |
| 2005/0117546 A1 | 6/2005 | Lioy et al. | |
| 2006/0114855 A1* | 6/2006 | Zheng | 370/331 |
| 2006/0126564 A1 | 6/2006 | Ramanna et al. | |
| 2006/0245395 A1* | 11/2006 | Jain et al. | 370/331 |
| 2006/0285519 A1 | 12/2006 | Narayanan et al. | |
| 2006/0291412 A1 | 12/2006 | Naqvi et al. | |
| 2006/0291489 A1 | 12/2006 | Naqvi et al. | |
| 2007/0140220 A1* | 6/2007 | Doradla et al. | 370/352 |
| 2007/0211726 A1* | 9/2007 | Kuang et al. | 370/395.3 |
| 2007/0253371 A1* | 11/2007 | Harper et al. | 370/331 |
| 2008/0192638 A1* | 8/2008 | Massiera et al. | 370/237 |
| 2008/0270534 A1* | 10/2008 | Xia et al. | 709/203 |

FOREIGN PATENT DOCUMENTS

| | | |
|---|---|---|
| JP | 2003070043 A | 3/2003 |
| JP | 2004515986 A | 5/2004 |
| JP | 2005229583 A | 8/2005 |
| JP | 2006092242 A | 4/2006 |
| JP | 2006042001 A | 2/2009 |
| WO | WO-2004004378 A1 | 1/2004 |
| WO | WO-2005/051026 A1 | 6/2005 |
| WO | WO-2006052487 A2 | 5/2006 |

OTHER PUBLICATIONS

3GPP2—WLAN Interworking, 3rd Generation Partnership Project 2 "3GPP2", 3GPP2 S.R0087-0, Version 1.0, Version Date: Jul. 22, 2004.

* cited by examiner

SYSTEM AND METHOD FOR HANDOFFS BETWEEN TECHNOLOGIES

CROSS REFERENCE TO RELATED APPLICATION

This application claims benefit under 35 U.S.C. § 119(e) of U.S. Provisional Patent Application No. 60/900,232, entitled "System and Method for Handoffs Between Technologies," filed Feb. 8, 2007, which is hereby incorporated by reference herein in its entirety.

TECHNICAL FIELD OF THE DISCLOSURE

Systems and methods for providing a handoff between access technologies is provided. An integrated chassis that handles the handoff between access technologies is also provided in some embodiments.

BACKGROUND OF THE DISCLOSURE

Wireless access is provided by a multitude of technologies such as CDMA (code division multiple access), GSM (Global System for Mobile Communications), general packet radio service (GPRS), Universal Mobile Telecommunications System (UMTS), WiFi (Wireless Fidelity—IEEE 802.11), and WiMAX (Worldwide Interoperability for Microwave Access—IEEE 802.16). These technologies allow a user to access a network with a mobile node. A mobile node can be a cell phone, a laptop computer with a PCMCIA wireless card, or a personal digital assistant (PDA) for example. Typically, devices have been developed to work on a single technology. For example, a laptop computer connects with a WiFi PCMCIA wireless card or a cell phone is a CDMA phone. However, mobile nodes are beginning to be manufactured with the ability to access multiple networks such as a CDMA network and a WiMAX network. If a mobile node is in range of a CDMA antenna and can receive service using this antenna, the mobile node communicates through this technology. When the same mobile node is later within the range of a hot spot, the user can use this technology to communicate. Allowing a user to roam between technologies would permit the user to have more service options as well as allowing service providers to offer more service plans.

SUMMARY OF THE DISCLOSURE

Systems and methods for providing handoffs between different access technologies are provided. In some embodiments, other communication network equipment is unaware of the handoff between different access technologies. In a handoff between different access technologies, an integrated chassis can use the existing setup for the mobile node regardless of the technology and provide applications and services uninterrupted through a handoff involved different access technologies. Because the existing setup is used and the identification information stays the same, the communication network can continue communicating with the mobile node through the integrated chassis uninterrupted.

In some embodiments an integrated chassis residing in a communication network is provided that includes a session manager implemented in a computer readable medium in operative communication with a processor that receives control information and data from a mobile node in a first access technology and sets up a session for the mobile node, the session communicates with at least one access technology stack that manages packet processing for a particular access technology, an access technology demux manager implemented in a computer readable medium in operative communication with a processor that selects the session manager assigned to communications received from a mobile node, and the access technology demux manager selecting the same session manager where an existing session is setup when a handoff occurs and the access technology changes to a second access technology.

In certain embodiments, a network communication method is provided that includes receiving a request from a mobile node to begin a session in a first access technology, in response to the request, providing the mobile node with identification information used to identify the mobile node in a communication network and setting up an access technology stack to manage packet processing in the first access technology and a session to manage identification information and communication with the communication network, receiving from the mobile node control information and data at the access technology stack, determining to begin a session in a second access technology, and providing the same identification information and selecting the same session to manage identification information and communication with the communication network and setting up an access technology stack to manage packet processing in a second access technology.

DETAILED DESCRIPTION OF THE DISCLOSURE

Systems and methods for providing a handoff between access technologies are disclosed. The access technologies that can be involved are CDMA, GSM, GPRS, UMTS, WiFi, or WiMAX for example. Two types of handoff cases are disclosed: an inter-technology handoff and an intra-technology handoff. An inter-technology handoff involves a handoff where call session is passed from one network entity to another network entity. An intra-technology handoff involves a handoff where the call session remains on the same network entity even though the access technology changes. In some embodiments, the network entity is a integrated chassis that supports more than one type of access technology. For example, the integrated chassis can function both as a packet data serving node (PDSN) for CDMA access, as an access service network gateway (ASNGW) for WiMAX access, and as a Gateway GPRS Support Node (GGSN) for GSM, GPRS, and UMTS access. The integrated chassis can also preserve identification information and other information relating to a mobile node through a handoff involving different access technologies in some embodiments. Services and applications can be provided to the mobile node from the integrated chassis through a handoff involving different access technologies with little or no interruption.

Figure 1:
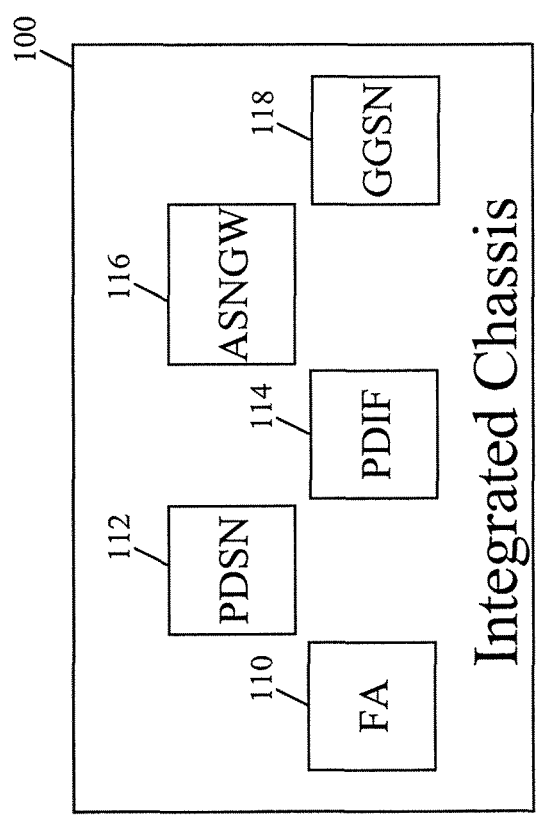
FIG. 1 is a block diagram illustrating logical components in an integrated chassis in accordance with certain embodiments.

FIG. 1 illustrates an integrated chassis 100 in accordance with certain embodiments of the invention. Integrated chassis 100 includes a foreign agent (FA) 110, a PDSN 112, a packet data interworking function (PDIF) 114, an ASNGW 116, and a GGSN 118. In some embodiments, integrated chassis is constructed using multipurpose packet processing hardware that is controlled by processor driven software. The packet processing hardware can include cards that include processors and memory and the software can be Linux based and placed on the memory of the one or more cards. The functionality of PDSN 112, for example, can be implemented in the software with the software using the hardware to perform the desired functionality. An example of a device that can be used to implement an integrated chassis is Tewksbury, Mass. based Starent Networks Corp.'s Intelligent Mobile Gateway.

Foreign agent 110 allows mobile nodes using Mobile IP to roam by providing an address and a device to forward data to the mobile node. PDSN 112 provides for the establishment, maintenance, and termination of a point-to-point protocol session with the mobile node, which provides a communication link (layer 2 in the open systems interconnection model) for data to flow between the mobile node and the network. GGSN 118 is similar to PDSN 112 in that it also provides a layer 2 communication link to the mobile node. Further, both the PDSN and GGSN are used in cellular networks to provide service to mobile nodes. PDIF 114 enables a WiFi or IEEE 802.11 connection through an access point. ASNGW 116 provides WiMAX or IEEE 802.16 access to a mobile node. Because integrated chassis 100 supports more than one access technology, service providers can allow users to leverage the access technology better suited to providing them access to the network. For example, if the user is at the airport and both WiFi and CDMA access are provided, the user can typically receive a higher bandwidth on a short-range WiFi connection. However, because CDMA access technology is longer range, if the user was on the edge of a WiFi connection the user may be better served by using the CDMA access technology. The integrated chassis also provides users with more options to connect. For example, the service provider can offer a greater number of access options because a number of technologies are supported on the same integrated chassis.

Figure 2:
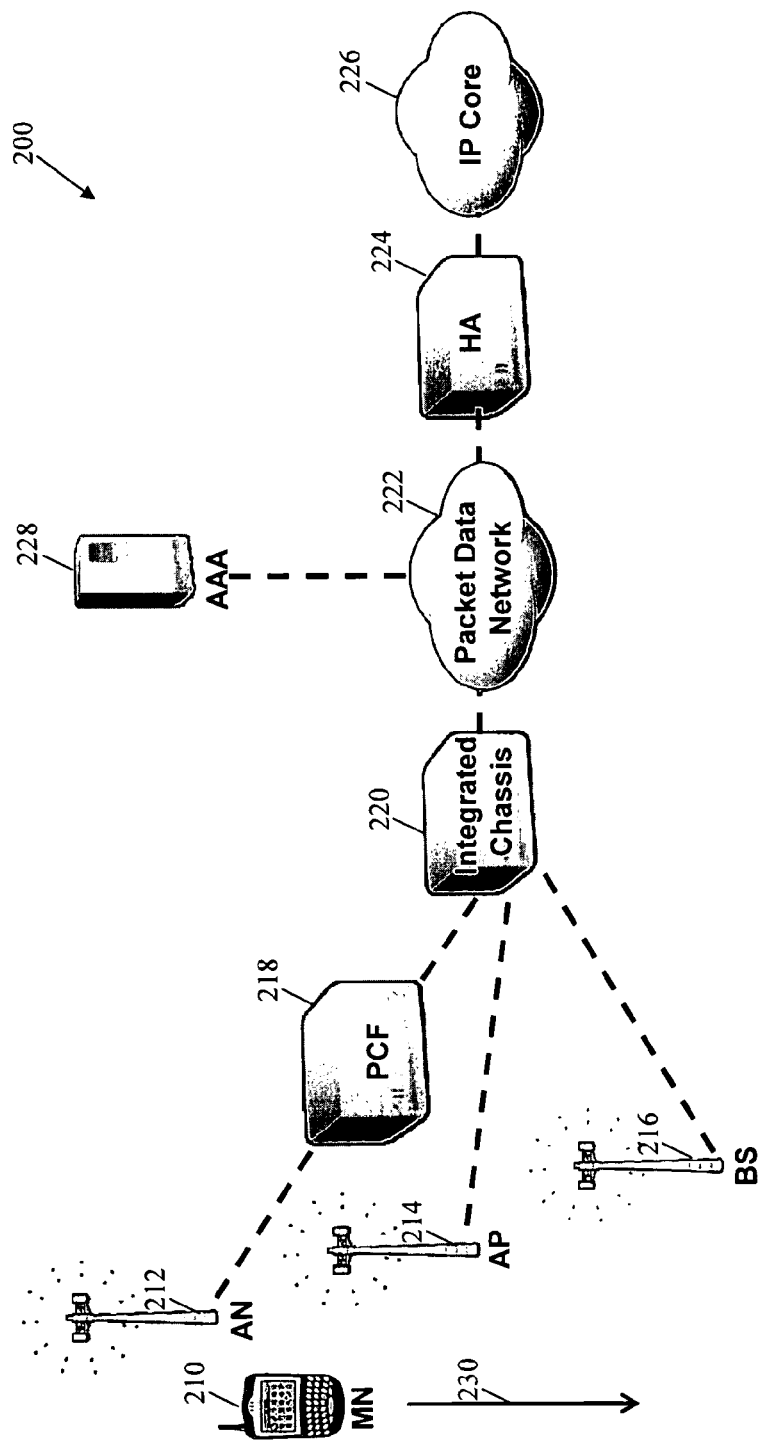
FIG. 2 is a block diagram illustrating an intra-technology handoff in accordance with certain embodiments.

FIG. 2 illustrates an intra-technology handoff in a communication system 200 in accordance with certain embodiments of the invention. Communication system 200 includes a mobile node (MN) 210, an antenna (AN) 212, an access point (AP) 214, a base station (BS) 216, a packet control function (PCF) 218, an integrated chassis 220, packet data network 222, home agent (HA) 224, IP core 226, and authentication, authorization, and accounting (AAA) server 228. The access point 214 and base station 216 may be in the same network as integrated chassis 220, or may be located in another network. This other network can be operated by another party. For example, company A may install WiFi access points in airport terminals and company B can have CDMA antennas in the area. Company B can use integrated chassis 220 to connect the access points of company A to provide access to company B subscribers. The integrated chassis 220 would allow continuity of the session by serving as an anchor point in some embodiments. The accounting can be recorded to track the services used. The benefits to the consumer are access to the connection and technology that can best serve the consumer as well as increased coverage where there is no overlap in service coverage.

When mobile node 210 moves (shown by arrow 230) from one technology to another technology, integrated access gateway can preserve the IP address assigned to mobile node 210. This allows mobile node 210 to keep the session through a handoff between technologies and can provide for a seamless and fast handoff between the technologies. Integrated chassis 220 can keep the same IP address for mobile node 210 because integrated chassis 220 can service the session in both technologies due to its integrated nature. The integrated nature allows the foreign agent (FA) to be same in an intra-technology handoff so home agent 224 can keep the same care of address (CoA). Home agent 224 may not detect the handoff because the CoA remains the same. If the mobile node issues a registration request, home agent 224 can treat the registration request as a registration renewal. In some embodiments, mobile node 210 can be implemented so that mobile node does not send a registration request when an intra-technology handoff occurs. FIGS. 3-8 show intra-technology handoffs in accordance with certain embodiments of the invention.

Figure 3:
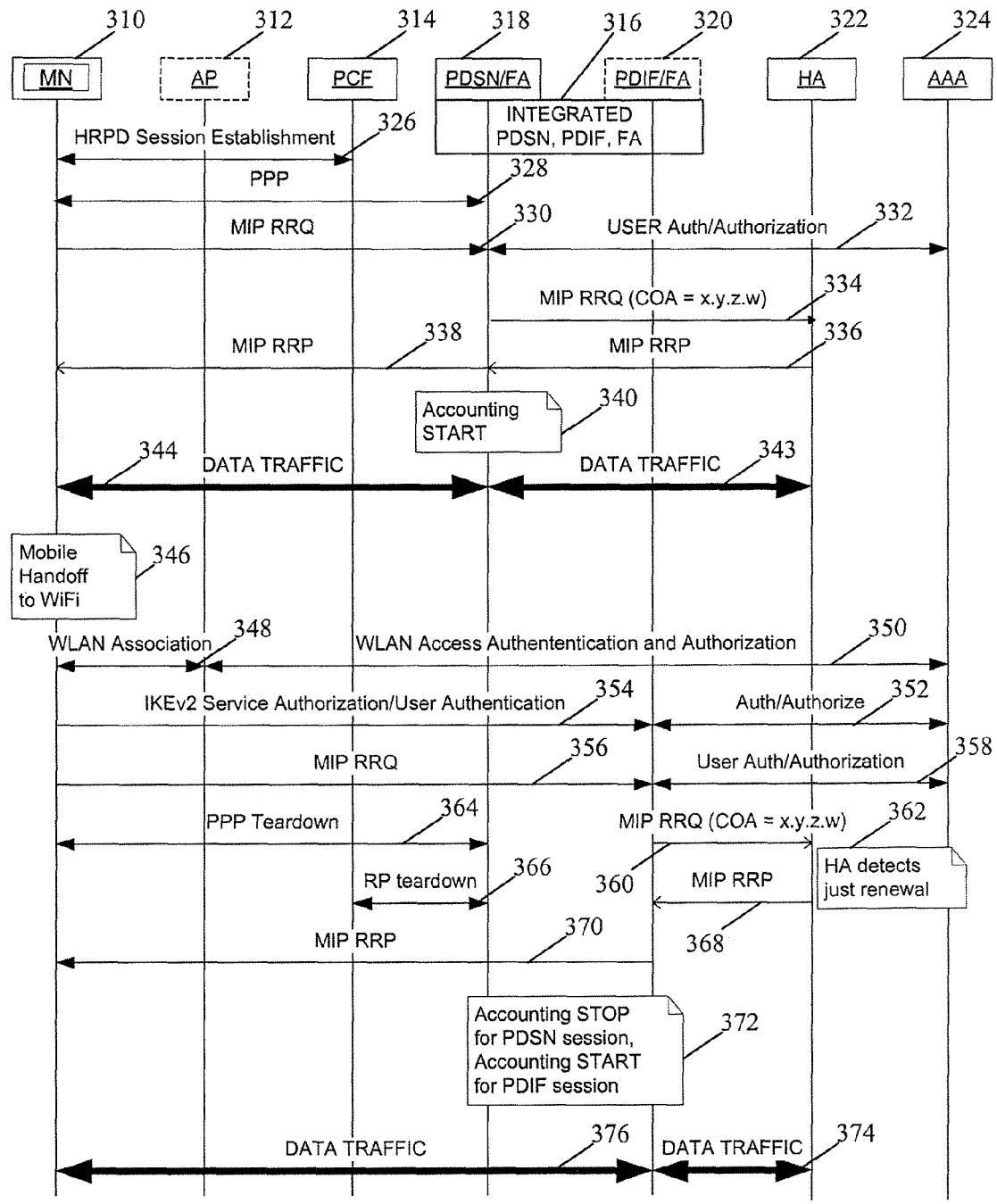
FIG. 3 is a messaging diagram illustrating messaging for a CDMA to WiFi intra-technology handoff in accordance with certain embodiments.

FIG. 3 illustrates an intra-technology handoff from a PDSN to a PDIF in accordance with certain embodiments of the invention. The network devices included in an intra-technology handoff of FIG. 3 are mobile node (MN) 310, access point (AP) 312, packet control function (PCF) 314, integrated chassis 316, packet data serving node (PDSN)/foreign agent (FA) 318, packet data interworking function (PDIF)/FA 320, home agent (HA) 322, and authentication, authorization, and accounting (AAA) server 324. Mobile node 310 initiates an air interface session with PCF 314 using high-rate data packet link 326. A point-to-point (PPP) session 328 is setup between mobile node 310 and PDSN/FA 318. PPP session 328 allows IP packet data communication over a link. A Mobile IP (MIP) registration request (RRQ) 330 is sent from mobile node 310 to PDSN/FA 318 to begin authorization. PDSN/FA 318 uses information received from mobile node 310 in MIP RRQ 330 to conduct authorization 332 with AAA 324. After authorizing mobile node 310, PDSN/FA 318 sends a MIP RRQ 334 to HA 322. MIP RRQ 334 includes a CoA of PDSN/FA 318 along with other information. HA 322 can use information obtained from MIP RRQ 334 to send a MIP registration reply (RRP) 336. MIP RRP 336 includes an IP address for mobile node 310 in some embodiments. In other embodiments, the IP address is assigned by PDSN/FA 318. PDSN/FA 318 sends a MIP RRP 338 to mobile node 310 to inform the mobile node about the session including an IP address for mobile node 310. Accounting begins 340, and data traffic flow begins. Data traffic is sent to HA 322, which directs data traffic 342 to the CoA, which is the address for PDSN/FA 318. PDSN/FA 318 forwards data traffic 344 to mobile node 310.

At some point, a handoff 346 from CDMA to WiFi occurs. The handoff can be triggered by the mobile node, the user, or the network. For example, the user might notice that he can receive a better signal from a WiFi access point 312 and decide to switch, or the mobile node might be set to switch to WiFi access when signal coverage is detected. Mobile node 310 associates with access point 312 using a wireless local area network (WLAN) association 348. Access point 312 initiates WLAN access authentication and authorization 350 with AAA 324. In some embodiments, where the WLAN is not trusted by integrated chassis 316, AAA 324 may be a different AAA that is located in the WLAN network. An internet key exchange version 2 (IKEv2) authorization and authentication message 354 is sent to PDIF/FA 320 to pass key information or other security information. This information can be used to authorize and authenticate 352 mobile node 310 with AAA 324. Mobile node 310 sends a MIP RRQ 356 to PDIF/FA 320 to begin a session and MIP RRQ 356 can include information that is used for User authentication and authorization 358. PDIF/FA 360 sends a MIP RRQ 360 including the same CoA because the FA is still the same. HA 322 receives what appears to be the same MIP RRQ as before and detects a registration renewal. The PPP link between mobile node 310 and PDSN/FA can be torn down 366 and the radio packet (RP) link between PCT 314 and PDSN/FA 318 can be torn down 366 as well. PDIF/FA 320 sends a MIP RRP 370 to mobile node 310 to send various information about the session. At 372, accounting based on PDSN session charging is stopped and accounting for at PDIF session is begun. During a handoff, a bi-casting tunnel may be setup to allow data traffic to delivered to provide a seamless handoff. After the handoff to PDIF/FA 320 data traffic 374 from HA 322 is directed to mobile node 310 in data traffic 376.

Figure 4:
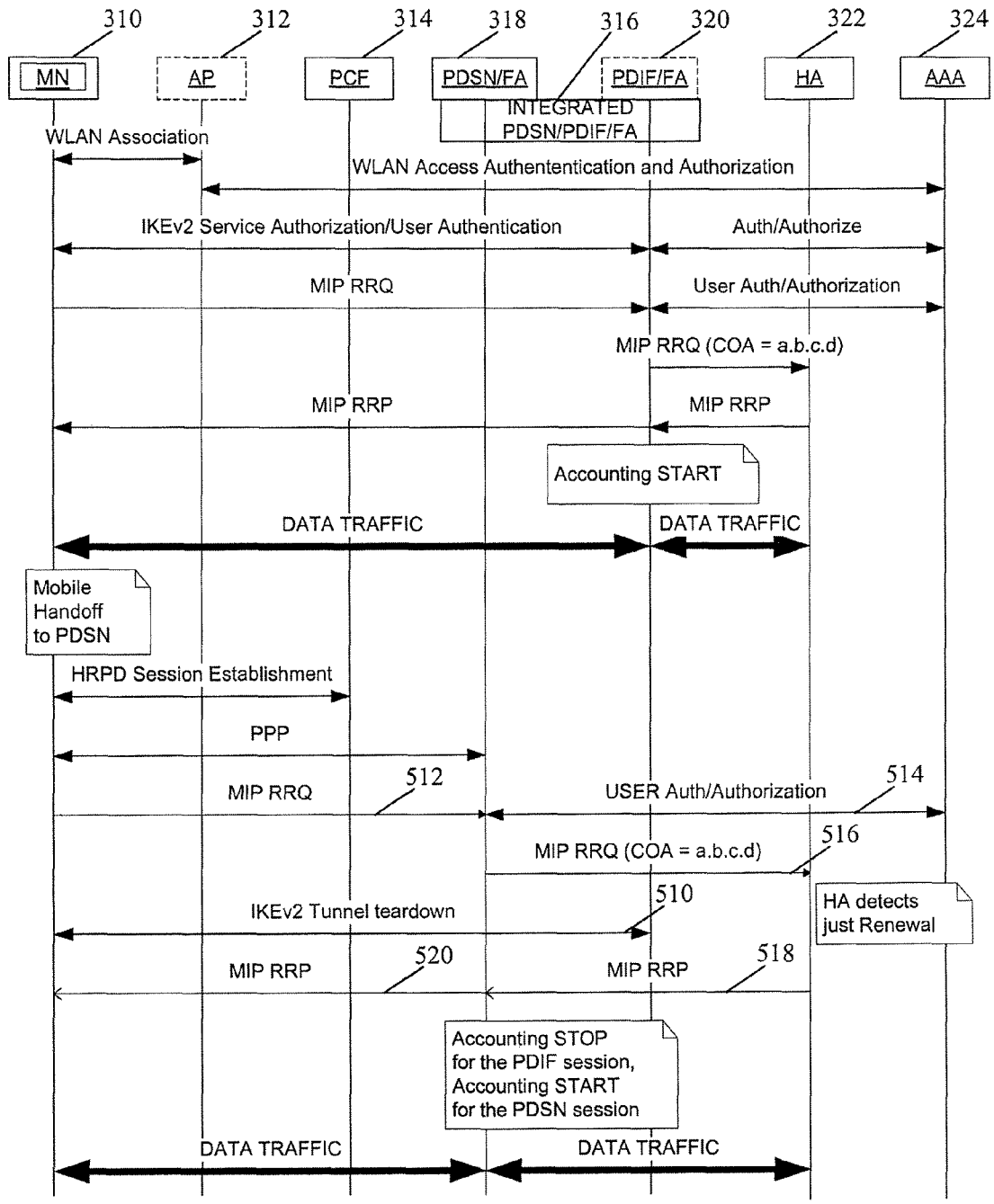
FIG. 4 is a messaging diagram illustrating messaging for a WiFi to CDMA intra-technology handoff in accordance with certain embodiments.

FIG. 4 illustrates an intra-technology handoff from PDIF 320 to PDSN 318 in accordance with certain embodiments of the invention. The handoff from PDIF 320 to PDSN 318 involves similar signaling as illustrated in FIG. 3 and described above. As described above for FIG. 3, the handoff from PDIF 320 to PDSN 318 can involve a bi-casting tunnel, which in some embodiments is implemented by delaying IKEv2 tunnel teardown 410. Also in some embodiments, MIP RRQ 412 and 416, user authentication and authorization 414, and MIP RRP 418 and 420 can be eliminated because the session is continued with the handoff. This can be implemented by modifying the mobile node MIP to not send MIP RRQ 412.

This modification can be implemented by creating an abstract datalink layer to link the various access technologies. The mobile node can be notified by the datalink layer, which is the underlying layer below the network layer. When a technology handoff occurs, the datalink layer mechanism informs the network layer about the changes so that the protocols (such as TCP/UDP) can continue working. In certain embodiments, this abstract datalink layer can allow the change to occur without triggering a registration request or a binding update.

Figure 5:
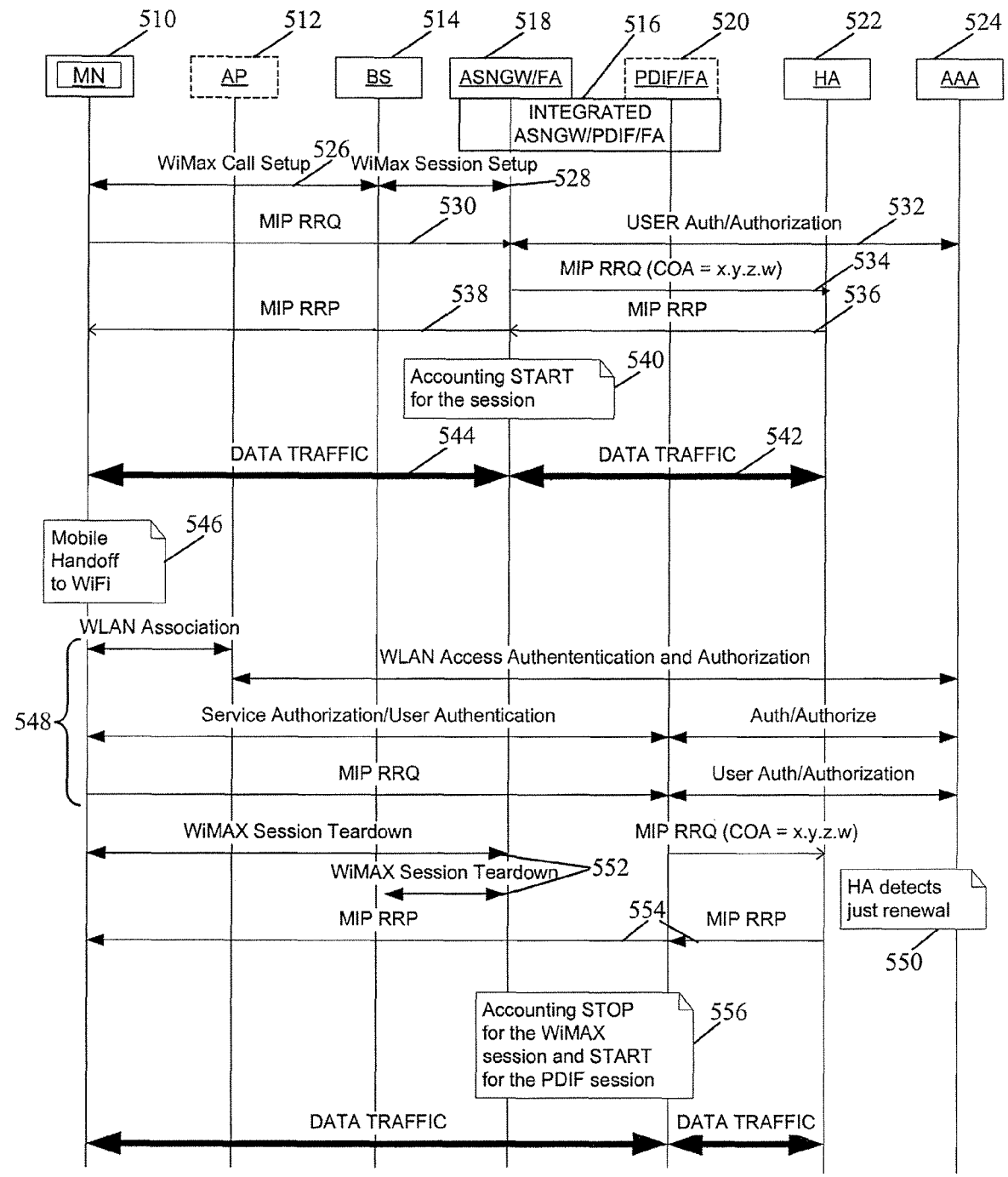
FIG. 5 is a messaging diagram illustrating messaging for a WiMAX to WiFi intra-technology handoff in accordance with certain embodiments.

FIG. 5 illustrates an intra-technology handoff from an ASNGW to a PDIF in accordance with certain embodiments of the invention. The network devices included in an intra-technology handoff of FIG. 5 are mobile node (MN) 510, access point (AP) 512, base station (BS) 514, integrated chassis 516, access service network gateway (ASNGW)/foreign agent (FA) 518, packet data interworking function (PDIF)/FA 520, home agent (HA) 522, and authentication, authorization, and accounting (AAA) server 524. Mobile node 510 initiates a WiMAX call setup 526 to establish communication with base station 514. A WiMAX session setup 528 is initiated between base station 514 and ASNGW/FA 518 to begin a session. Mobile node 510 sends a MIP RRQ 530 to ASNGW/FA 518, which includes information to authenticate and authorize mobile node as well as requests information to begin data traffic. ASNGW/FA 518 sends information to authenticate and authorize 532 mobile node 510 to AAA 524. ASNGW/FA 518 receives back from AAA 524 information regarding mobile node 510 such as whether the mobile node is valid. ASNGW/FA 518 sends a MIP RRQ 534 that includes a care of address (CoA) to HA 522. HA 522 sends a MIP RRP to ASNGW/FA 518 that includes information that is used by ASNGW/FA 518 to setup a session. ASNGW/FA 518 sends mobile node 510 a MIP RRP 538 to pass information to mobile node 510 regarding the session such as the IP address for mobile node 510. In 540, accounting of the services used by mobile node 510 is begun. Data traffic 542 and 544 is routed through home agent 522 and ASNGW/FA 518. Home agent 522 serves as a fixed point in the network to send and receive data traffic and does not change for a mobile node. ASNGW/FA 518 serves as a forwarding point for data traffic to the mobile node.

An intra-technology handoff of mobile node 510 to WiFi is begun at 546. The messaging for the WiFi access setup is similar to that explained for FIG. 3. During 548, messaging is exchanged to setup communications as well as authenticate and authorize mobile node 510. If mobile node 510 sends a MIP RRQ, which can be avoided in some embodiments, home agent 522 detects what it believes is a registration renewal at 550. Home agent 522 detects a registration renewal because the CoA remains the same in an intra-handoff. The WiMAX session undergoes a teardown when the session is no longer needed. MIP RRP messaging 554 is sent to renew the session information. The session information can remain the same as in MIP RRP 536 and 538. At 556, accounting for the WiMAX can stop and accounting for the PDIF session can begin. Data traffic can then flow through the PDIF technology to mobile node 510.

Figure 6:
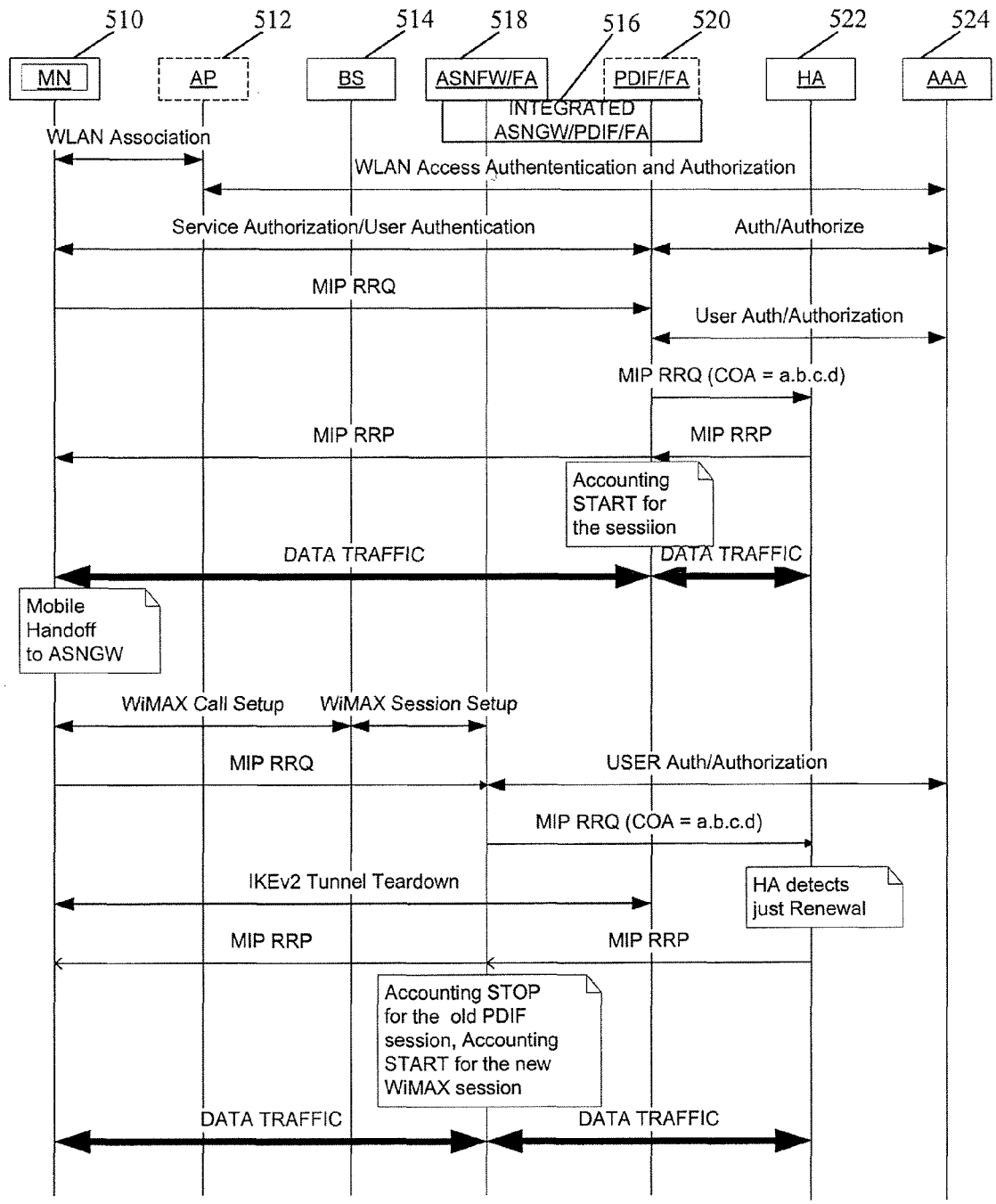
FIG. 6 is a messaging diagram illustrating messaging for a WiFi to WiMAX intra-technology handoff in accordance with certain embodiments.
Figure 7:
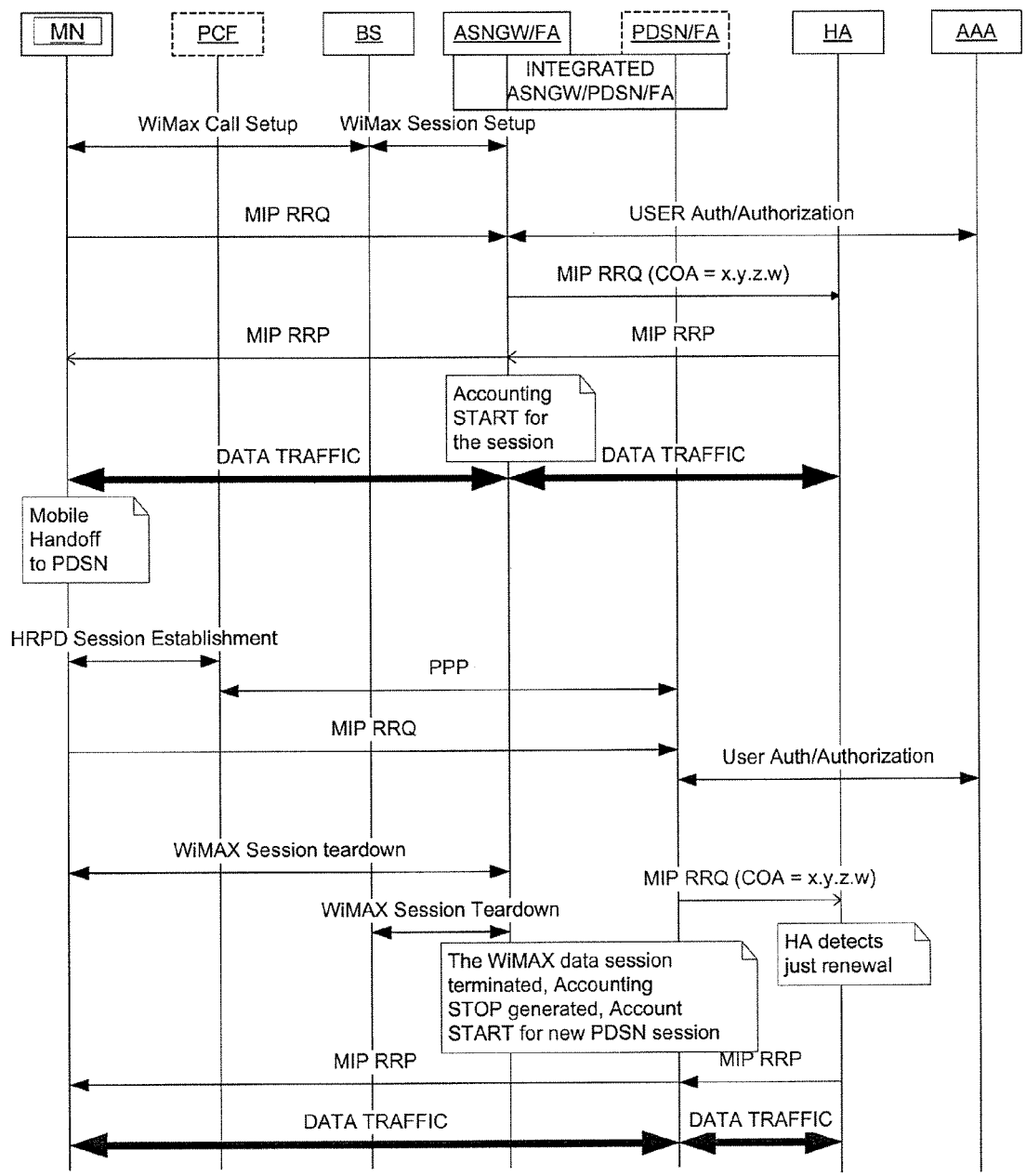
FIG. 7 is a messaging diagram illustrating messaging for a WiMAX to CDMA intra-technology handoff in accordance with certain embodiments.
Figure 8:
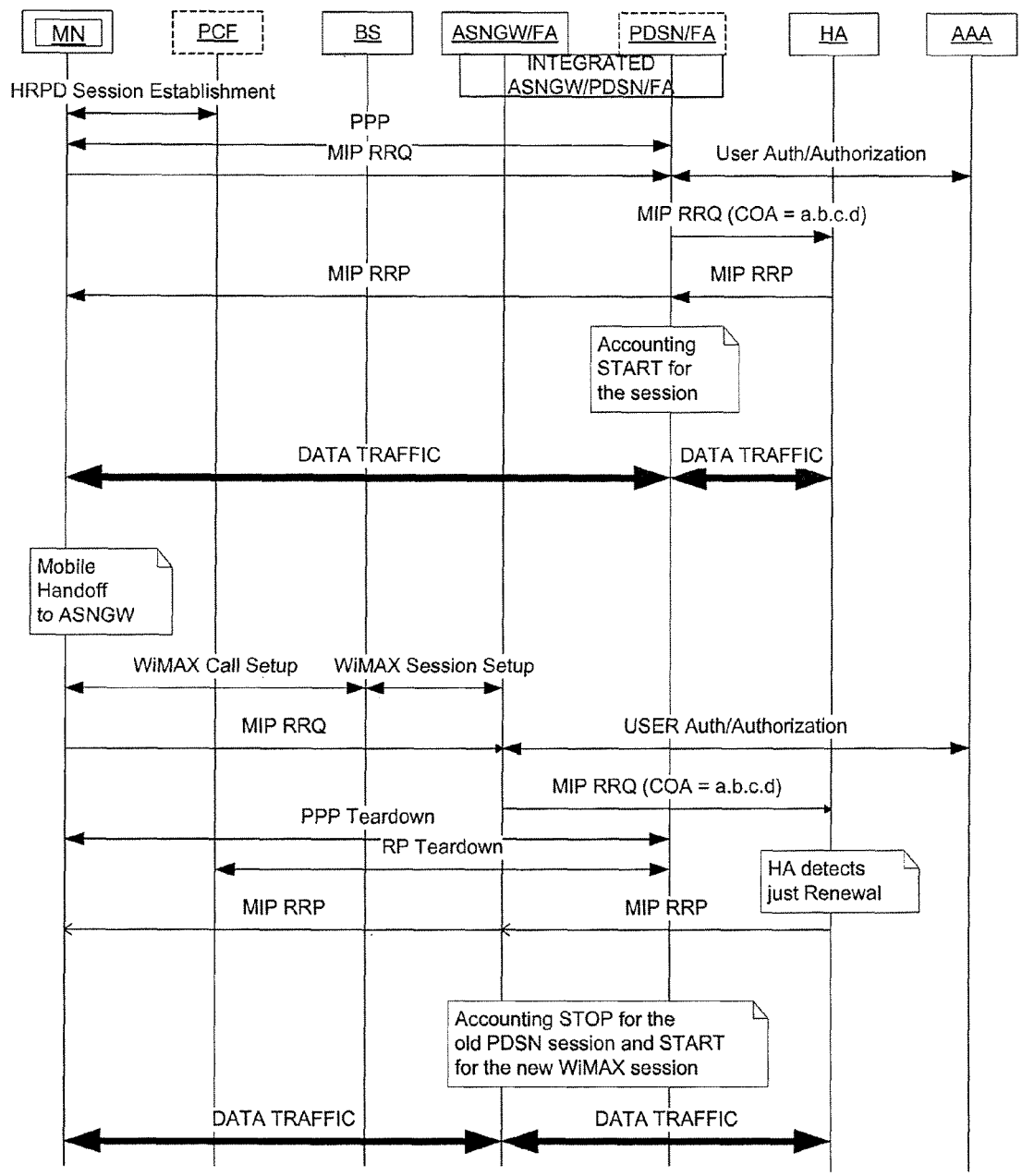
FIG. 8 is a messaging diagram illustrating messaging for a CDMA to WiMAX intra-technology handoff in accordance with certain embodiments.

FIG. 6 illustrates an intra-technology handoff from PDIF to ASNGW in accordance with certain embodiments of the invention. The handoff from PDIF 520 to ASNGW 518 involves similar signaling as illustrated in FIG. 5 and described above. Further, data traffic can be bi-casted to mobile node 510 in each technology during the handoff procedure illustrated in FIGS. 5 and 6. In both FIG. 5 and FIG. 6 mobile node 510 retains its IP address through the handoff to the other technology. FIG. 7 illustrates an intra-technology handoff from an ASNGW to a PDSN in accordance with certain embodiments of the invention. The WiMAX signaling is similar to that described above, e.g., in FIG. 5, and the CDMA signaling is similar to that described above, e.g., in FIG. 3. FIG. 7 illustrates an intra-technology handoff from a PDSN to an ASNGW in accordance with certain embodiments of the invention. The signaling used in the handoff is similar to that which has been described above.

In some embodiments, a GGSN may be involved in one of the handoffs. The handoff can be from a PDSN to a GGSN, from a PDIF to a GGSN, or from an ASNGW to a GGSN, for example. As shown in FIG. 1, GGSN functionality is implemented in the integrated chassis. Thus, when a GGSN intra-technology handoff occurs the mobile node can keep the same IP address and the session can continue. In some embodiments, the GGSN uses Mobile IP. Further, GPRS and UMTS can be extended to support such a handoff. The differences between a PDSN handoff and a GGSN handoff are the underlying access technologies. For example, the GGSN uses GPRS/UMTS with GPRS tunneling protocol from the serving GPRS support node (SGSN) (not shown). The PDSN uses a R-P link from the packet control function (PCF). As one practiced in the field would appreciate, the methods described herein can be applied to other types of technology handoffs such as GGSN to ASNGW.

Figure 9:
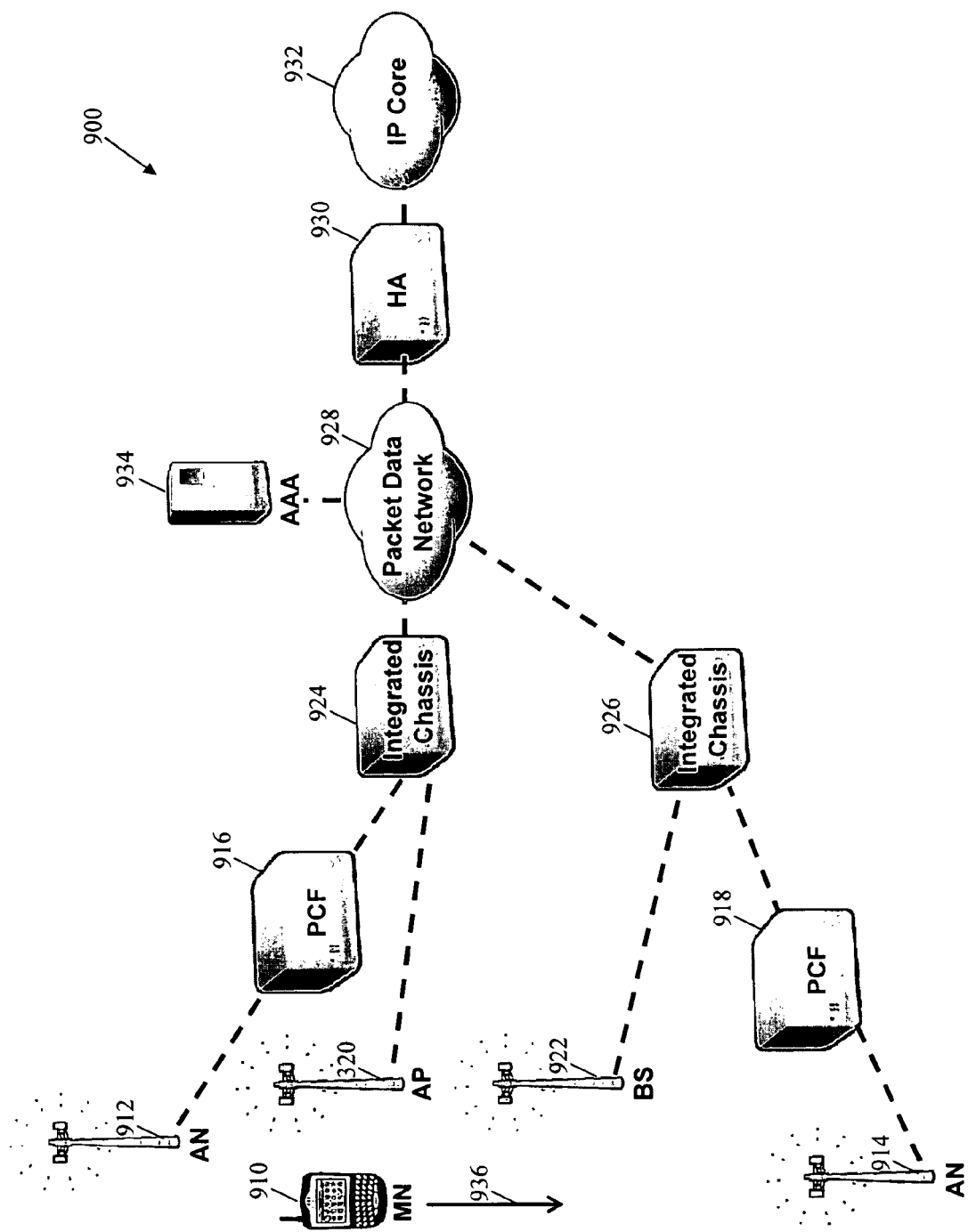
FIG. 9 is a block diagram illustrating an inter-technology handoff in accordance with certain embodiments.

FIG. 9 illustrates an inter-technology handoff 900 in accordance with some embodiments of the invention. Illustrated inter-technology handoff 900 network equipment includes a mobile node (MN) 910, antennas (AN) 912 and 914, packet control functions (PCFs) 916 and 918, access point (AP) 920, base station (BS) 922, integrated chassis 924 and 926, packet data network 928, home agent (HA) 930, IP core 932, and authentication, authorization, and accounting (AAA) server 934. In some embodiments, an inter-technology handoff is from one integrated chassis 924 to another integrated chassis 926. Thus, the call session for mobile node 910 switches the chassis that is handling the session during the handoff. Each integrated chassis, as shown, can handle more than one technology. With an inter-technology handoff, home agent 930 detects the handoff because a new care of address (CoA) is sent to the home agent. A registration revocation request can be issued to the chassis previously handling the session to release the registration information, in some embodiments.

Figure 10:
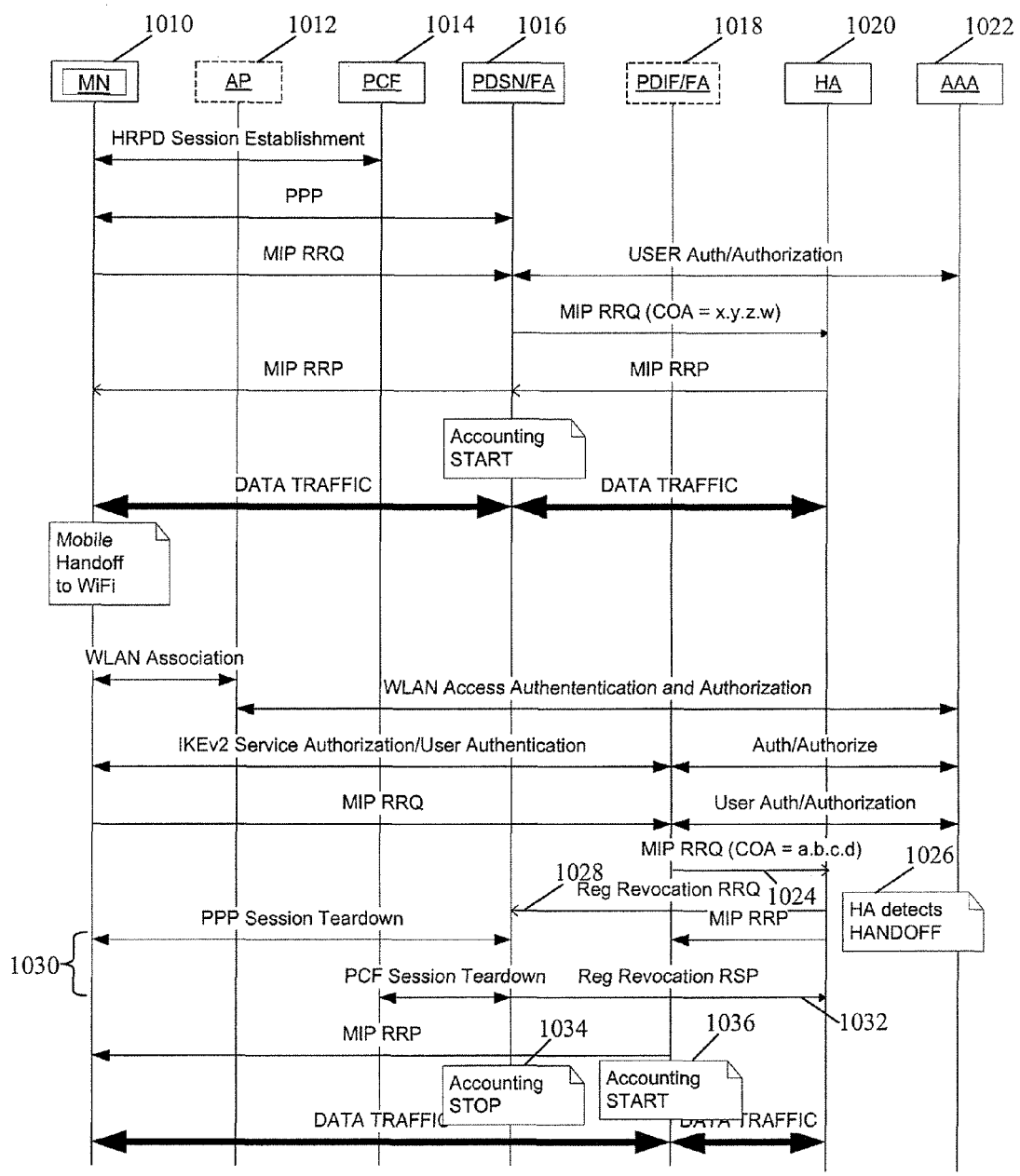
FIG. 10 is a messaging diagram illustrating messaging for a CDMA to WiFi inter-technology handoff in accordance with certain embodiments.

FIGS. 10-15 illustrate inter-technology handoff signaling using Mobile IP in accordance with certain embodiments of the invention. In some embodiments, much of the inter-technology signaling used for session setup, authorization, and accounting is similar to the signaling used in intra-technology handoffs. FIG. 10 illustrates an inter-technology handoff from a PDSN to a PDIF in accordance with certain embodiments of the invention. The network devices included in the handoff signaling are a mobile node (MN) 1010, an access point (AP) 1012, a packet control function (PCF) 1014, a packet data serving node (PDSN)/foreign agent (FA) 1016, packet data interworking function (PDIF) 1018, a home agent (HA) 1020, and an authentication, authorization, and accounting (AAA) 1022. The inter-technology handoff of FIG. 10 differs from an intra-technology handoff in that there is a change of the care of address (CoA) in MIP RRQ 1024. The CoA changes because the chassis handling the session changes in some embodiments. Further, Home agent 1020 detects a handoff in 1026 because a different chassis issues MIP RRQ 1024. HA 1020 issues a registration revocation request 1028 to PDSN 1016 to remove the session from PDSN 1016. This can prompt a teardown of the session 1030 at PDSN 1016. PDSN 1016 sends HA 1020 a registration revocation response 1032 to indicate when the session is removed. The inter-technology handoff involves sending accounting changes from PDSN 1016 to stop the accounting 1034 and from PDIF 1018 to start the accounting 1036.

Figure 11:
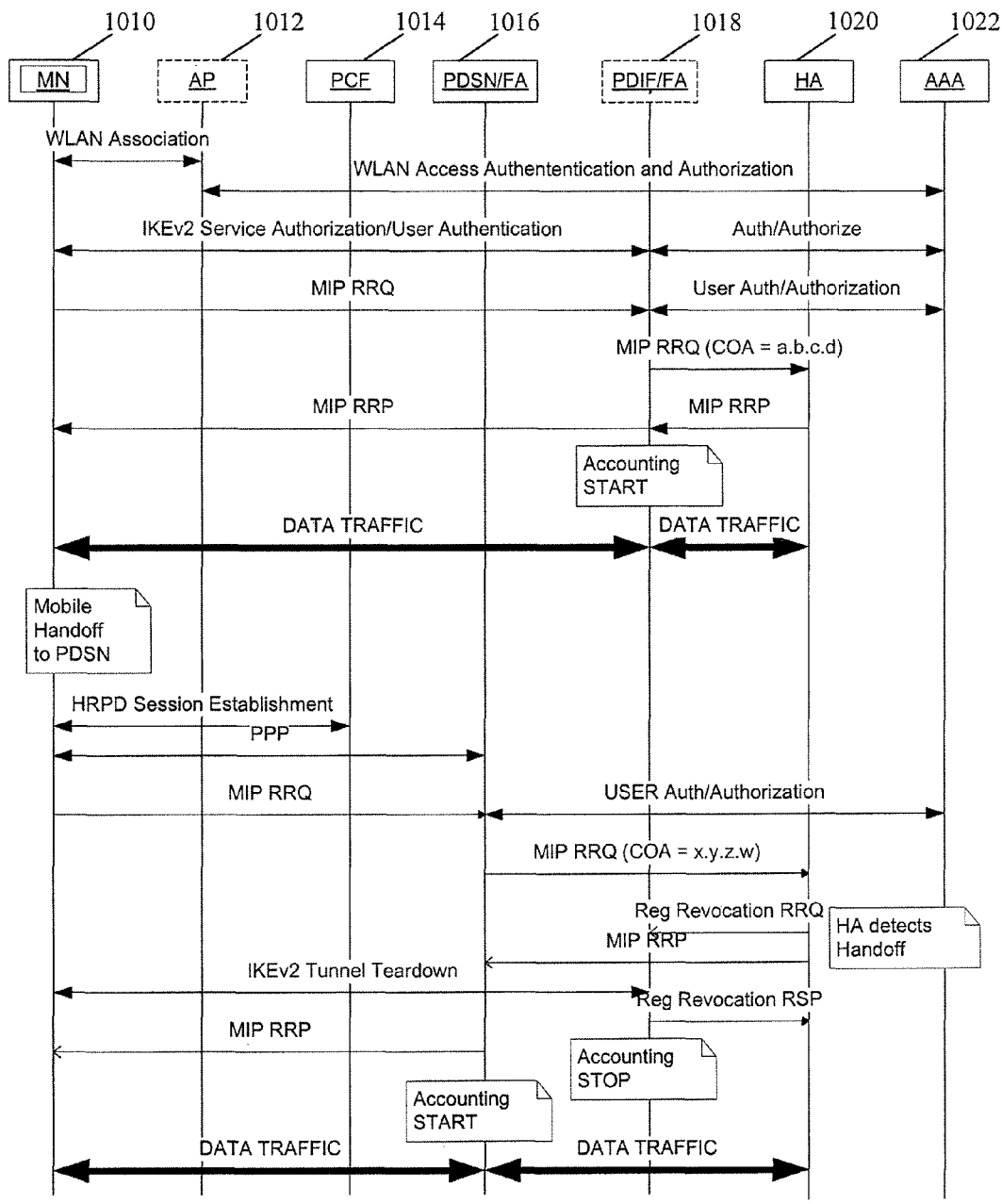
FIG. 11 is a messaging diagram illustrating messaging for a WiFi to CDMA inter-technology handoff in accordance with certain embodiments.
Figure 12:
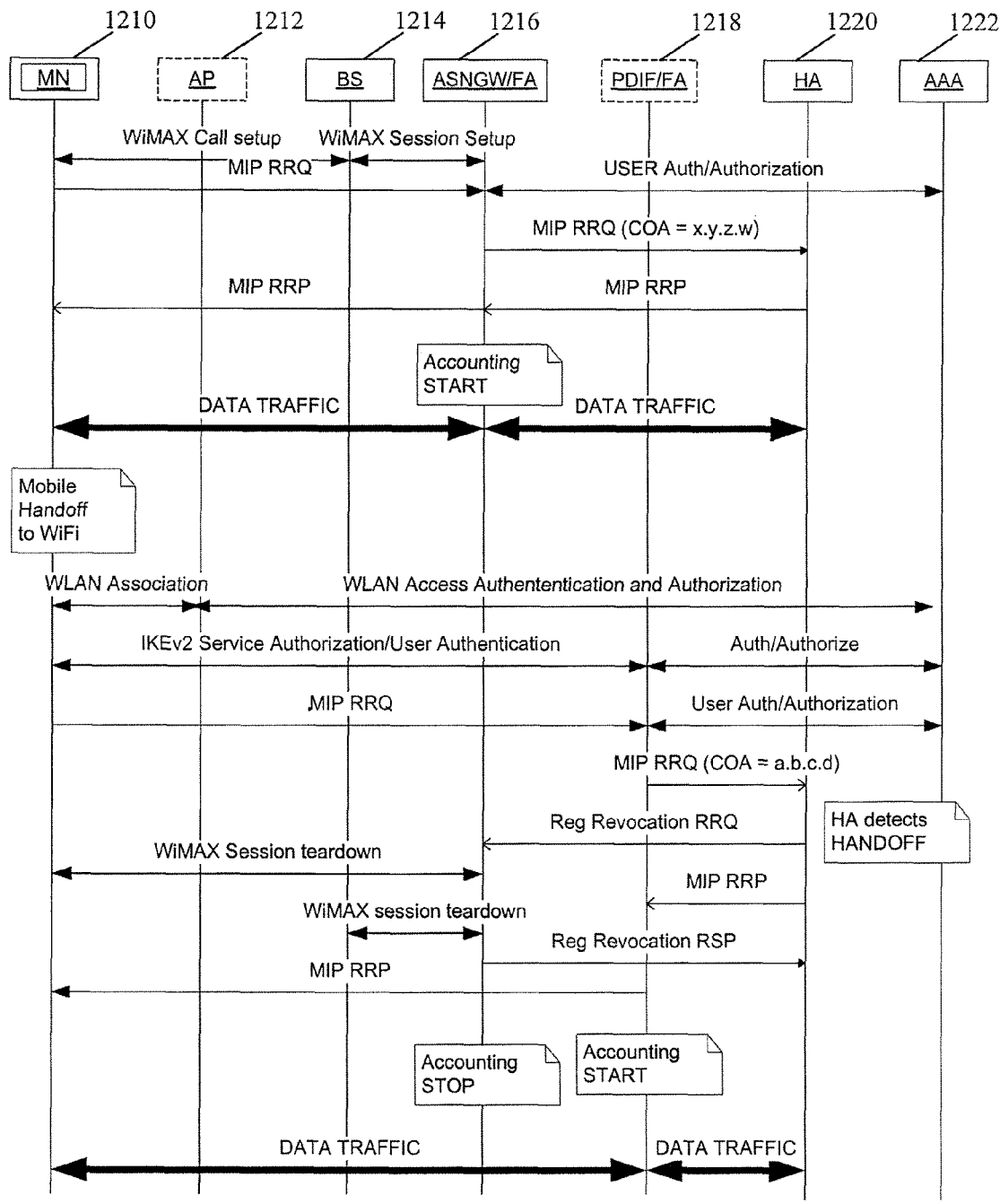
FIG. 12 is a messaging diagram illustrating messaging for a WiMAX to WiFi inter-technology handoff in accordance with certain embodiments.
Figure 13:
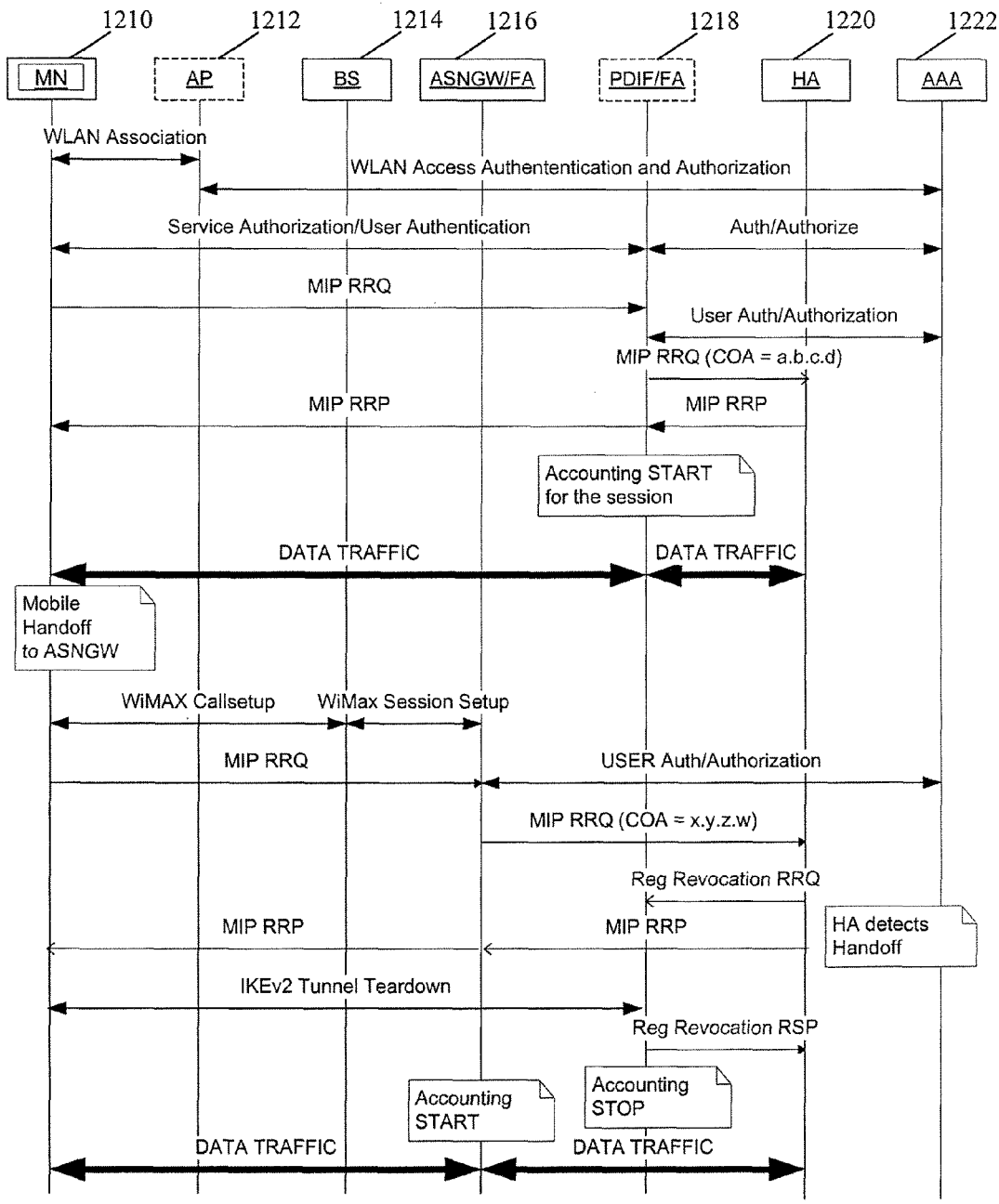
FIG. 13 is a messaging diagram illustrating messaging for a WiFi to WiMAX inter-technology handoff in accordance with certain embodiments.
Figure 14:
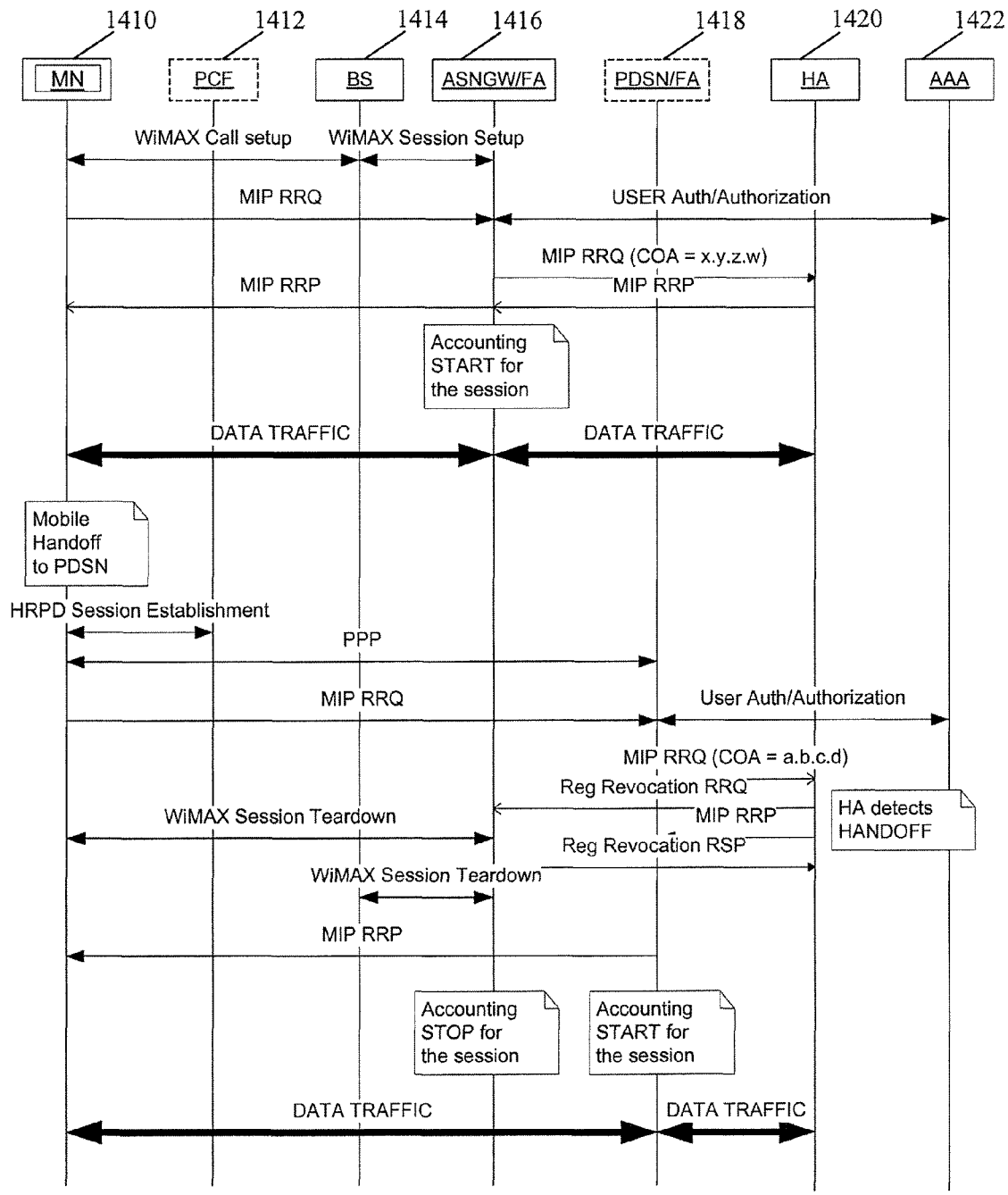
FIG. 14 is a messaging diagram illustrating messaging for a WiMAX to CDMA inter-technology handoff in accordance with certain embodiments.
Figure 15:
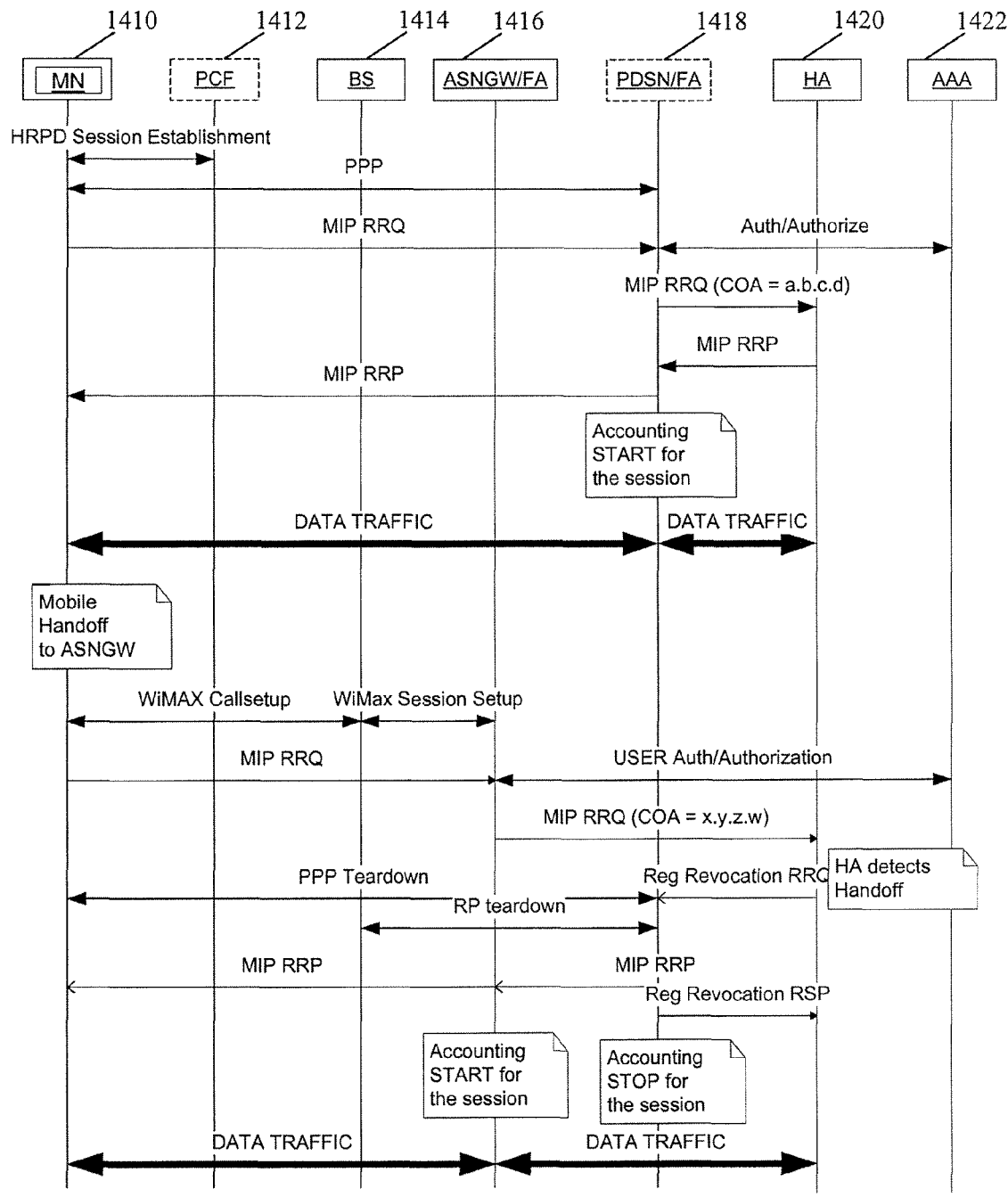
FIG. 15 is a messaging diagram illustrating messaging for a CDMA to WiMAX intra-technology handoff in accordance with certain embodiments.

FIG. 11 illustrates an inter-technology handoff using Mobile IP in accordance with certain embodiments of the invention. The signaling of FIG. 11 is similar to the signaling explained above except that the handoff is from PDIF 1018 to PDSN 1016. FIG. 12 illustrates an inter-technology handoff from an ASNGW to a PDIF using Mobile IP in accordance with some embodiments of the invention. The network devices included in the handoff signaling are a mobile node (MN) 1210, an access point (AP) 1212, a base station (BS) 1214, an access service network gateway (ASNGW)/foreign agent (FA) 1216, packet data interworking function (1218), a home agent (1220), and an authentication, authorization, and accounting (AAA) 1222. FIG. 13 illustrates an inter-technology handoff from ASNGW 1216 to PDIF 1218 using Mobile IP in accordance with certain embodiments of the invention. FIG. 14 illustrates an inter-technology handoff from an ASNGW to a PDSN using Mobile IP in accordance with some embodiments of the invention. The network devices included in the handoff signaling are a mobile node (MN) 1410, a packet control function (PCF) 1412, a base station (BS) 1414, an access service network gateway (ASNGW)/ foreign agent (FA) 1416, packet data serving node (PDSN) 1418, a home agent (HA) 1420, and an authentication, authorization, and accounting (AAA) 1422. FIG. 15 illustrates an inter-technology handoff from PDSN 1418 to ASNGW 1416 using Mobile IP in accordance with some embodiments of the invention.

In some embodiments, a mobile node can use Simple IP to connect the network. With a Simple IP mobile node, the mobile node connects to the integrated chassis and relies on the integrated chassis for an IP address. Similar to the Mobile IP embodiments described above, when an intra-technology handoff occurs with a Simple IP mobile node, the same IP address can be given to the mobile node. This allows a Simple IP mobile node to keep a session across technologies. Typically, a Simple IP mobile node has to receive a new IP address after a handoff. This is because a home agent is not involved in the assigning of an IP address to the mobile node.

In some embodiments, Proxy Mobile IP can be used between anchoring points (e.g., PDSN, PDIF, ASNGW, or GGSN) and the home agent to provide a Simple IP mobile node with the same IP address. Proxy Mobile IP is similar to Mobile IP (MIP), except that the MIP client is in the network instead of being a mobile node. For example, if the Proxy Mobile IP client is a PDSN and then the mobile node is handed off to a PDIF, the Proxy MIP client changes to the PDIF. The integrated chassis can initiate a Proxy MIP registration with a reverse tunneling option with the home agent. The Proxy MIP registration can include a request for addressing information in certain embodiments. If the handoff has just occurred and the PDIF is initiating a Proxy MIP registration request with the home agent on behalf of the mobile node, the home agent can recognize that the mobile node is the same one and re-assign the same IP address. By using Proxy MIP with a Simple IP mobile node, the Simple IP mobile node can be given the same IP address when roaming. A benefit of keeping the same IP address for the mobile node is that a user's applications do not terminate when a handoff occurs.

Figure 16:
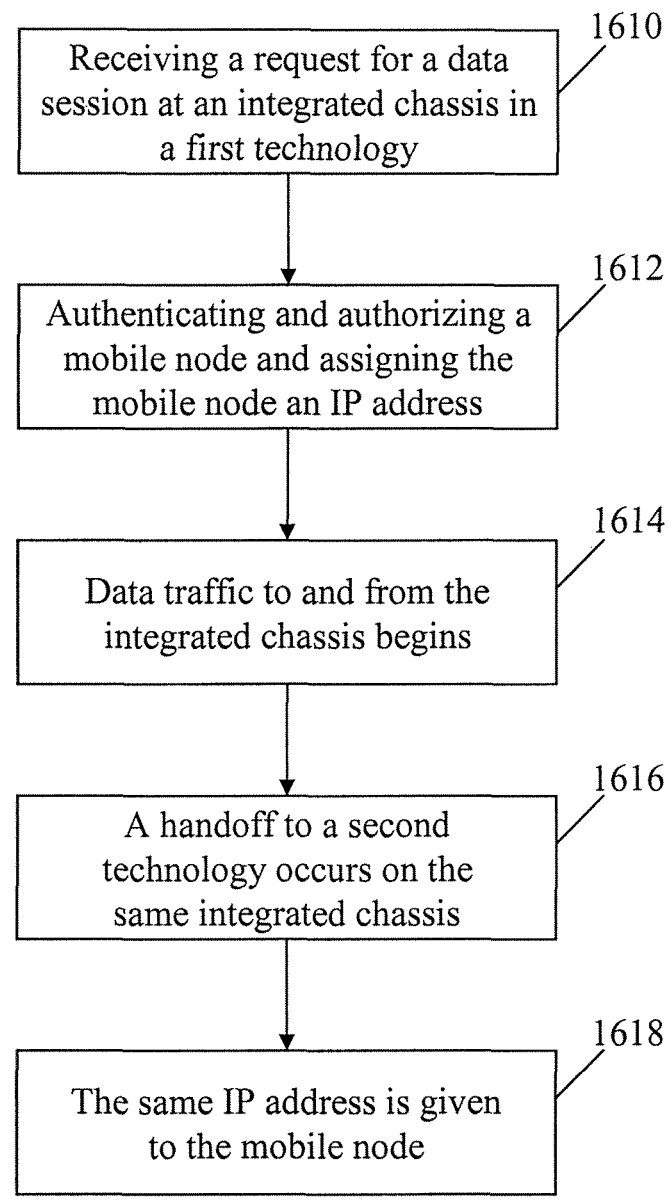
FIG. 16 is a flow diagram illustrating an intra-technology handoff in accordance with certain embodiments.

FIG. 16 illustrates a flow diagram regarding an intra-technology handoff in accordance with certain embodiments of the invention. In 1610, an integrated chassis, which includes modules that support multiple access technologies, receives a request for a data session in a first technology from a mobile node. The mobile node is authenticated and authorized and is given an IP address in 1612. In 1614, data traffic to and from the integrated chassis begins. In 1616, a handoff from the first technology to a second access technology occurs on the same integrated chassis. The same IP address is given to the mobile node in 1618.

Figure 17:
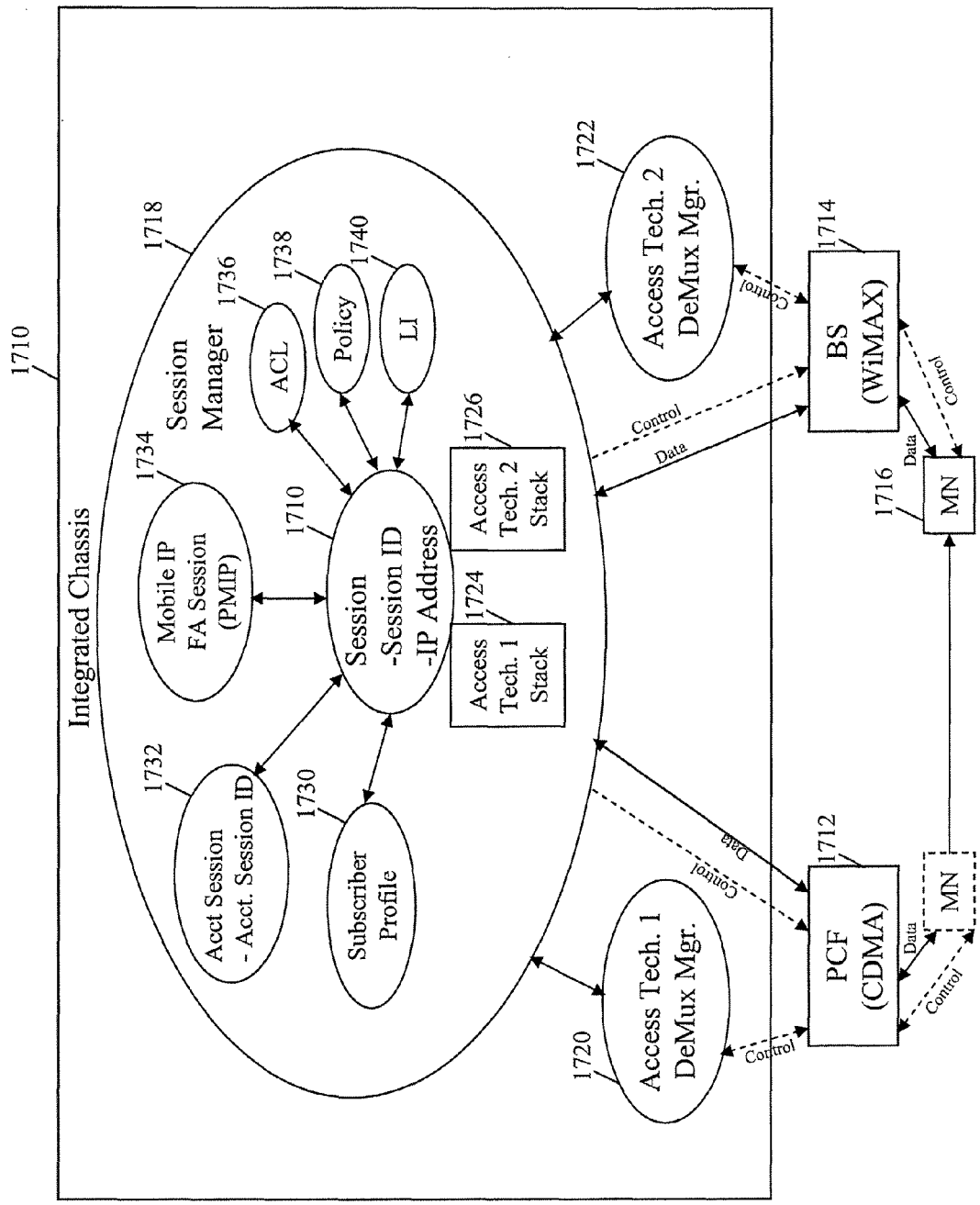
FIG. 17 is a block diagram illustrating an integrated chassis supporting two different access technologies in accordance with certain embodiments.

FIG. 17 illustrates a system for providing an intra-technology handoff in accordance with certain embodiments of the invention. The illustrated system includes an integrated chassis 1710, a packet control function (PCF) 1712, a base station (BS) 1714, and a mobile station (MS) or mobile node (MN) 1716. Integrated chassis includes a session manager 1718, an access technology 1 DeMux Manager 1720, and an access technology 2 DeMux Manager 1722. Session manager 1718 can include access technology 1 stack 1724, access technology 2 stack 1726, session 1728, subscriber profile 1730, account session 1732, Mobile IP FA Session 1734, access control list (ACL) 1736, policy 1738, and lawful interception (LI) 1740. One practiced in the field would recognize that other access technologies described above can be implemented within the system shown in FIG. 17 and the use of PCF 1712 and BS 1714 is for purposes of explanation.

In an intra-technology handoff, mobile node 1716 moves from PCF 1712 to BS 1714 and from a CDMA access technology to a WiMAX access technology. Control signaling is directed to a DeMux manager, e.g., DeMux manager 1722 for BS 1714. DeMux manager 1722 selects the session manager that handles the session for mobile node 1716. The session manager selection can be based on criteria such as load or other factors. DeMux manger 1722 can use a key to locate session manager 1718. This key can be proprietary, a network access identifier (NAI), or a mobile station identifier (MSID). A lookup can be completed to map the handoff of MS 1716 to the same session manager. Multiple DeMux managers and session managers can exist. Session manager 1718 is shown for this explanation because the session is undisturbed through the intra-technology handoff and so DeMux manager 1722 selects the same session manager 1718 for handling the session. In some embodiments, at least one DeMux manager exists for each access technology running on an integrated chassis. Different types of DeMux managers can exist for the various access technologies in certain embodiments. For example, the DeMux manager can be specialized to the control signaling that exists for a particular access technology.

Access technology 1 stack 1724 and access technology 2 stack 1726 are designed to handle packet processing that can be specific to an access technology. For example, different tunneling may exist among the access technologies in the control and data signaling. In CDMA GRE packets are used to tunnel the information, so access technology 1 stack 1724 can process these packets removing the protocol specific modifications and pass the packets to session manager 1718. Session 1728 includes context information, which is undisturbed in handoff. The context information can include keys such as the session ID and the IP address. In some embodiments, layer 3 and above session information remains undisturbed through the handoff. Subscriber profile 1730 includes configuration information for a particular user or mobile node. This information can include whether the mobile node is configured for compression and the type of authentication for which the mobile node is configured, for example. Account session 1732 includes accounting data records for a user or mobile node. Mobile IP foreign agent session 1734 provides proxy mobile IP (PMIP) capabilities as well as Mobile IP capabilities to mobile nodes. Access control list (ACL) 1736 can provide packet filtering based on certain criteria. Policy 1738 provides QoS policy rules for application to packet flows. Other modules such as lawful interception may be provided in session manager 1718. Session manager 1718 and DeMux manager 1720 and 1722 can be implemented in a combination of hardware and software. The software can be a combination of logic and data structures to provide the functionality described.

In some embodiments, the integrated chassis can include slots for loading application cards and line cards. A midplane can be used in the integrated chassis to provide intra-chassis communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the integrated chassis implemented by establishing inter-card communications between application cards and line cards. The control bus interconnects the control and management processors within the integrated chassis. The integrated chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The integrated chassis supports at least two types of application cards: a switch processor card and a packet accelerator card. The switch processor card serves as a controller of the integrated chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the integrated chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, or PDIF).

The integrated chassis' software can be divided into a series of tasks that perform specific functions. These tasks communicate with each other as needed to share control and data information throughout the integrated chassis. A task is a software process that performs a specific function related to system control or session processing. Three types of tasks operate within the integrated chassis in some embodiments: critical tasks, controller tasks, and manager tasks. The critical tasks control functions that relate to the integrated chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on an integrated chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of integrated chassis configuration parameter changes and is responsible for storing configuration data for the applications running within the integrated chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile node's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, software needed for implementing a process includes a high level procedural or an object-orientated language such as C, C++, C#, Java, or Perl. The software may also be implemented in assembly language if desired. In certain embodiments, the software is stored on a storage medium, such as a computer readable medium, or device such as read-only memory (ROM), programmable-read-only memory (PROM), or magnetic disk that is readable by a general or special purpose-processing unit to perform the processes described in this document. In some embodiments, the same IP address is given to a mobile node on an intra-chassis handoff without using Mobile IP or Proxy Mobile IP. In some embodiments, dynamic host configuration protocol (DHCP) is used to obtain an IP address for the mobile node.

Although the present invention has been described and illustrated in the foregoing embodiments, it is understood that the present disclosure has been made only by way of example, and that numerous changes in the details of implementation of the invention may be made without departing from the spirit and scope of the invention, which is limited only by the claims which follow.

We claim:

1. An integrated chassis residing in a communication network comprising:
   a processor;
   a memory for storing instructions and in operable communication with the processor;
   a plurality of session managers implemented in a computer-readable medium, the plurality of session managers in operative communication with and sharing the processor, the plurality of session managers for receiving control information and data from a mobile node in a first access technology and for setting up a session for the mobile node with the first access technology, each of the plurality of session managers configured for communicating with a first access technology stack and at least a second access technology stack to manage packet processing for either of the first or at least a second access technology to enable communication with the mobile node, wherein the second access technology stack implements an access service network gateway (ASNGW); and
   an access technology demux manager implemented in the computer-readable medium in operative communication with the processor for selecting for the session an assigned session manager from among the plurality of session managers for communicating with the mobile node with the first access technology,
   the access technology demux manager, in response to a handoff to a second access technology, for selecting the same assigned session manager from among the plurality of session managers where an existing session is set up in the first access technology such that the mobile node changes to a second access technology and retains the same assigned session manager.

2. The integrated chassis of claim 1, wherein the session retains identical identification information used to identify the mobile node on the communication network when the access technology changes from the first access technology to the second access technology.

3. The integrated chassis of claim 2, wherein the identification information is an internet protocol (IP) address.

4. The integrated chassis of claim 1, wherein the first access technology is one of 3GPP and 3GPP2, and the second access technology is WiMAX.

5. The integrated chassis of claim 1, wherein the first access technology is a cellular access technology and the second access technology is a wireless local area network.

6. The integrated chassis of claim 1, further comprising the assigned session manager for mapping a session to the mobile node in the chassis.

7. The integrated chassis of claim 1, further comprising the assigned session manager for providing access to the mobile node using a single IP address that is preserved across the handoff, and wherein the handoff is transparent to the IP core network.

8. A network communication method comprising:
receiving a request from a mobile node at a gateway to begin a session in a first access technology;
in response to the request, providing the mobile node with identification information used to identify the mobile node in a communication network and setting up a first access technology stack to manage packet processing in the first access technology and a session instance with an assigned session manager selected from among a plurality of session managers implemented in software and which reside at the gateway to manage identification information and communication with the communication network, the session managers each configured for communicating with the first access technology or a second access technology;
receiving from the mobile node control information and data at the first access technology stack;
while the mobile node is communicating in a session with the first access technology, determining to begin a session with the mobile node in response to a handover to the second access technology; and
at the gateway, providing the same identification information and selecting the same session instance with the same assigned session manager to manage identification information and communication with the communication network and setting up a second access technology stack to manage packet processing in the second access technology to enable communication with the mobile node, wherein the second access technology stack implements an access service network gateway (ASNGW).

9. The network communication method of claim 8, wherein the identification information is an internet protocol (IP) address.

10. The network communication method of claim 8, wherein the second access technology is WiMAX.

11. The network communication method of claim 8, wherein the first access technology is a cellular access technology and the second access technology is a wireless local area network.

12. The network communication method of claim 8, further comprising mapping a session to the mobile node at the gateway.

13. The network communication method of claim 8, further comprising the gateway providing access to the mobile node using a single IP address that is preserved after a handoff from the first access technology to the second access technology, and wherein the handoff is transparent to the IP core network.

14. Logic encoded in one or more non-transitory media that includes code for execution and when executed by a processor is operable to perform operations comprising:
receiving a request from a mobile node at a gateway to begin a session in a first access technology;
in response to the request, providing the mobile node with identification information used to identify the mobile node in a communication network and setting up a first access technology stack to manage packet processing in the first access technology and a session instance with an assigned session manager selected from among a plurality of session managers implemented in software and which reside at the gateway to manage identification information and communication with the communication network, the session managers each configured for communicating with the first access technology or a second access technology;
receiving from the mobile node control information and data at the first access technology stack;
determining to begin a session with the mobile node in response to a handover to the second access technology; and
at the gateway, providing the same identification information and selecting the same assigned session manager from among the plurality of session managers to manage identification information and communication with the communication network and setting up a second access technology stack to manage packet processing in the second access technology to enable communication with the mobile node, wherein the second access technology stack implements an access service network gateway (ASNGW).

15. The logic of claim 14, wherein the identification information is an internet protocol (IP) address.

16. The logic of claim 14, wherein the first access technology is one of 3GPP and 3GPP2, and the second access technology is WiMAX.

17. The logic of claim 14, wherein the first access technology is a cellular access technology and the second access technology is a wireless local area network.

18. The logic of claim 14, the operations further comprising mapping a session to the mobile node at the gateway.

19. The logic of claim 14, the operations further comprising the gateway providing access to the mobile node using a single IP address that is preserved after a handoff from the first access technology to the second access technology, and wherein the handoff is transparent to the IP core network.

* * * * *